US010754357B2

(12) United States Patent
Vennam et al.

(10) Patent No.: US 10,754,357 B2
(45) Date of Patent: Aug. 25, 2020

(54) OPTIMIZING A WATER RECOVERY SYSTEM

(71) Applicant: International Business Machines Corporation, Armonk, NY (US)

(72) Inventors: Ramratan Vennam, Austin, TX (US); Spencer T. Reynolds, Austin, TX (US); Belinda M. Vennam, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 16/011,926

(22) Filed: Jun. 19, 2018

(65) Prior Publication Data

US 2019/0384328 A1   Dec. 19, 2019

(51) Int. Cl.
*G05B 19/05* (2006.01)
*G05D 7/06* (2006.01)

(52) U.S. Cl.
CPC ......... *G05D 7/0629* (2013.01); *G05B 19/054* (2013.01); *G05B 2219/1105* (2013.01); *G05B 2219/13167* (2013.01)

(58) Field of Classification Search
CPC ............... G05D 7/0629; G05B 19/054; G05B 2219/13167; G05B 2219/1105
See application file for complete search history.

(56) References Cited

U.S. PATENT DOCUMENTS

| 5,210,886 A * | 5/1993 | Coe, III | E03B 1/04 |
| | | | 4/665 |
| 5,441,070 A | 8/1995 | Thompson | |
| 6,622,745 B1 | 9/2003 | Smith et al. | |
| 2010/0193049 A1 | 8/2010 | Bondura | |
| 2012/0279681 A1* | 11/2012 | Vaughan | F24D 10/003 |
| | | | 165/62 |
| 2013/0048083 A1 | 2/2013 | Sato | |
| 2015/0077132 A1* | 3/2015 | Watahiki | G01R 19/1659 |
| | | | 324/537 |
| 2018/0057379 A1 | 3/2018 | Upadhyay et al. | |

(Continued)

FOREIGN PATENT DOCUMENTS

| GB | 2048466 A | 12/1980 |
| WO | 2004061343 A1 | 7/2004 |

OTHER PUBLICATIONS

"Auto Spout RS-2001W Infrared Sensor Faucet Adaptor", newegg, <https://www.newegg.com/Product/Product.aspx?Item=9SIA0SS0821797>, printed Apr. 11, 2018, 5 pages.

(Continued)

*Primary Examiner* — Thomas C Lee
*Assistant Examiner* — Charles Cai
(74) *Attorney, Agent, or Firm* — Monchai Chuaychoo (57) ABSTRACT

Embodiments of the present invention provides a systems and methods for conserving liquids. The system detects, via sensors, if an object is interrupting the liquid flowing between a faucet and a drain. If the system detects an object is interrupting the flowing liquid, then the system routes the flowing liquid to a first destination using a diverter valve associated with the drain. The diverter valve is controlled by a microprocessor and connected to the sensors. However, if there are no object interrupting the flowing liquid, then the system routes the flowing liquid to a second destination.

19 Claims, 3 Drawing Sheets

(56) References Cited

U.S. PATENT DOCUMENTS

2018/0274211 A1* 9/2018 Dauleh .................. E03B 1/042
2018/0354432 A1* 12/2018 Van Beek ............... C02F 1/001
2019/0062144 A1* 2/2019 Greenbaum ............ B67D 7/74

OTHER PUBLICATIONS

"Branched Drain Greywater System", clean water components, <https://cleanwatercomponents.com/education/systems/branched-drain>, © Copyright 2018, printed Apr. 11, 2018, 3 pages.

"Moen Brantford Motionsense Two-Sensor Touchless One-Handle High-Arc Pulldown Kitchen Faucet Featuring Reflex, Oil-Rubbed Bronze (7185EORB)",<https://www.amazon.com/Moen-Motionsense-One-Handle-Oil-Rubbed-7185EORB/dp/B00CIXF15Q>, amazon, printed Apr. 11, 2018, 16 pages.

"Self-made DIY Greywater Systems—remote controlled for $130", YouTube, <https://www.youtube.com/watch?v=aCqeF5cAZkw>, Sep. 5, 2013, 2 pages.

"Shower system with electronically controlled diverter valve", Greywater Action, <https://greywateraction.org/branched-drain-system-from-a-shower/>, printed Apr. 11, 2018, 5 pages.

"Three Way Diverter Valves aka three port valves, 3-way valves, L-port valves", OASIS design, <http://oasisdesign.net/greywater/divertervalves/>, printed Apr. 11, 2018, 4 pages.

\* cited by examiner

OPTIMIZING A WATER RECOVERY SYSTEM

BACKGROUND OF THE INVENTION

The present invention relates generally to the field of water conservation and more particularly to efficient reuse of gray water.

A large quantity of water is wasted daily when clean water leaves a faucet and runs into the drain. This routinely occurs while user wait for water to reach a desired temperature, or when users are distracted while brushing their teeth. That water may not be contaminated beyond thresholds appropriate for grey water. Grey water, if captured by previous scenario, could be used for other purposes like watering plants, flushing toilets, and cleaning the car.

Therefore, realizing an efficient system for capturing and reusing water has a broad and fundamental interest in today's eco conscious society.

SUMMARY

According to one embodiment of the present invention, a method is provided. The method comprises: detecting, by one or more processors, if an object is interrupting liquid flowing between a faucet and a drain; responsive to detecting the object is interrupting the flowing liquid, routing, by the one or more processors, the flowing liquid to a first destination, based on sending a command to a diverter valve associated with the drain; and responsive to detecting the object is not interrupting the flowing liquid, routing, by the one or more processors, the flowing liquid to a second destination, based on sending a command to a diverter valve associated with the drain.

Another embodiment of the present invention, a computer program product is provided. the computer program product comprising: one or more computer readable storage devices and program instructions stored on the one or more computer readable storage devices, the stored program instructions comprising: program instructions to detect if an object is interrupting liquid flowing between a faucet and a drain; responsive to detecting the object is interrupting the flowing liquid, program instructions to route the flowing liquid to a first destination, based on sending a command to a diverter valve associated with the drain; and responsive to detecting the object is not interrupting the flowing liquid, program instructions to route the flowing liquid to a second destination, based on sending a command to a diverter valve associated with the drain.

Another embodiment of the present invention, a system is provided. The system comprising: a faucet attached to the top of a liquid containing shell; one or more sensors adjacent to the faucet; a drain connected to the bottom of the liquid containing shell for allowing liquid to exit; a diverter valve disposed within a first drain pipe and a second drain pipe and configured to direct the flow of liquids between the first drain pipe and the second drain pipe; and a control computer communicatively connected to the one or more sensors and a output module wherein the output module is connected to the diverter valve.

DETAILED DESCRIPTION

Embodiments of the present invention recognize that improvements to conserving water can be optimized by using sensor at the water source to detect and divert un-used water to a gray water storage for further use. Gray water or greywater is all wastewater generated in households or office buildings from streams without fecal or organic contamination. For example, all streams except for the wastewater from toilets can be considered gray water. The sources of gray water can include, sinks, showers, baths, clothes washing machines or dish washers. Since gray water contains fewer pathogens and organic matter than domestic wastewater (i.e. black water), it is generally safer to handle and easier to treat and reuse onsite for toilet flushing, landscape or crop irrigation, and other non-potable uses.

One embodiment of the present invention provides a system that comprises of water source (i.e., smart faucet) that includes one or more sensors (e.g., proximity, motion, fluid level, etc.) and a separate plumbing system for receiving gray water. For example, a user is washing his hands in the sink but is waiting for the water to become the desire temperature. During this waiting period, the water exiting the smart faucet is being wasted. A proximity sensor built into the smart faucet detect that there is no obstruction (i.e., hands are not near the faucet since the desire temperature has not been reached) and therefore, the smart faucet activates a drain valve to divert the water draining the sink into a gray water storage system instead of going to waste. In another example, another user is hand-washing dishes under the kitchen sink. The system detects the dishes blocking the stream and routes the water to the normal drain. When the system does not detect dishes actively blocking the stream of water, it will route the water to the gray water storage system. In addition to saving gray water, the embodiment of the system is less complicated and less expensive to implement.

In another embodiment, the system can detect objects block a water filling up in a sink. For example, a user decides to fill up the sink with water instead of running the water to wash his hands (i.e., decides to wash his hands in the sink of full water instead). The water filling up the sink would be detected as an object blocking the path between the water and the bottom of the sink/drain (the distance detected between the sensor at the water source/faucet would be less than the distance from the sensor to the bottom of the sink). This would cause the system to direct the water toward the drain rather than the grey water storage tank. When the water finished draining from the sink, the sensor would detect that the distance from the water source/faucet to the bottom of the sink is the expected full distance indicating that nothing is blocking the path of the water from the faucet to the bottom of the sink. On detecting this full distance stream, water draining at this time would be saved in the grey water tank. This enables the system to save only uncontaminated water. If the sink contains dirty items soaking in a full sink, it is possible that the water is too contaminated for saving in a grey water tank.

In yet another embodiment, the faucet is used in a laboratory or medical environment (i.e., Center for Disease Control) that works on pathogens to ensure no biological contaminant goes to the sewage system. For example, a laboratory sink is used to rinse off medical equipment (e.g., syringe, pipets, forceps, knives, etc.). Thus, the water draining can be routed to the sewage system. However, if the sensor detects a blockage (i.e., rinsing equipment), it would route the contaminated water to different tank in order to be sterilized before it can go out to the sewage system.

Detailed description of embodiments of the claimed structures and methods are disclosed herein; however, it is to be understood that the disclosed embodiments are merely illustrative of the claimed structures and methods that may be embodied in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

Figure 1:
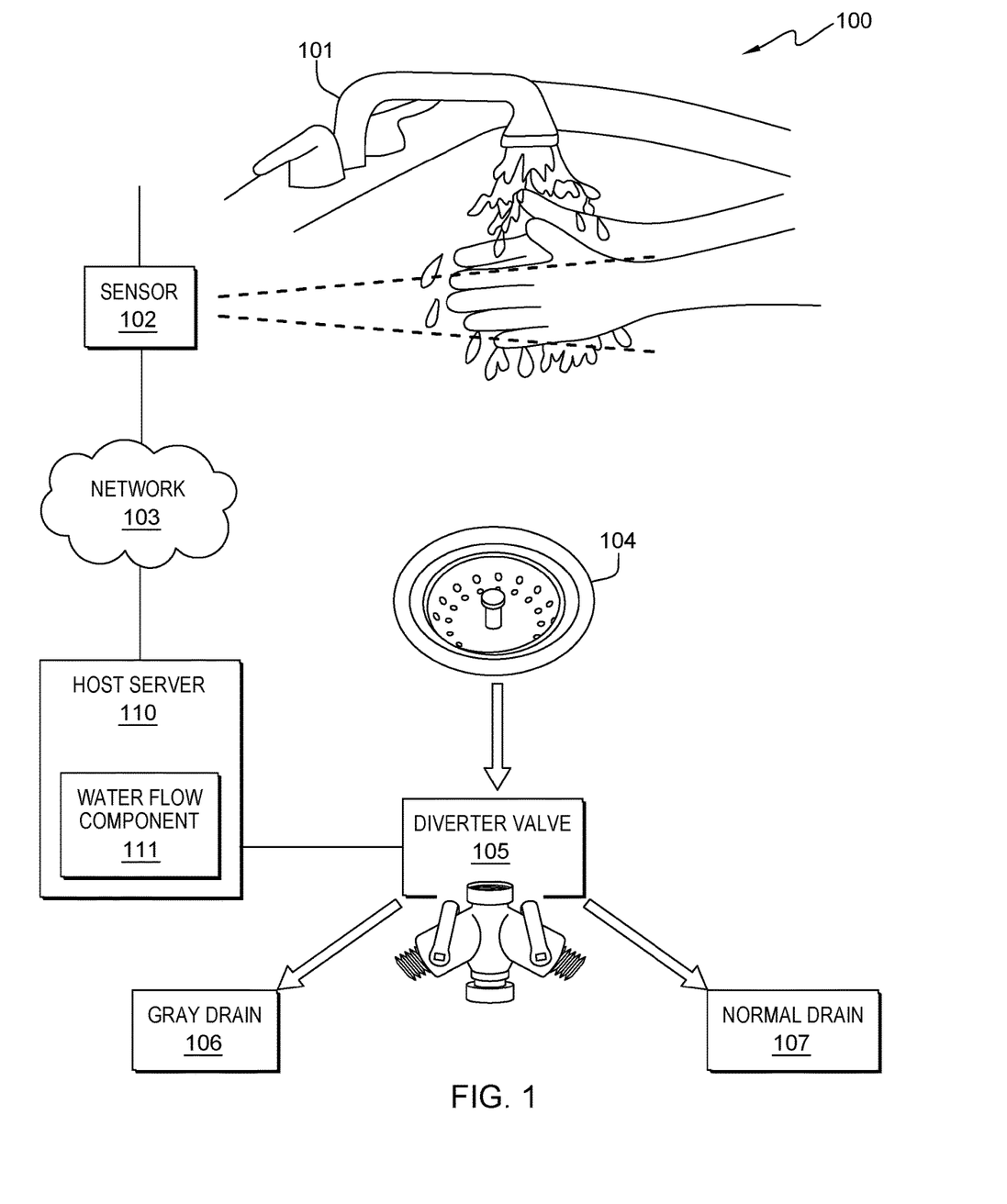
FIG. 1 is a functional block diagram illustrating the topology of the water conservation environment 100, in accordance with an embodiment of the present invention.

FIG. 1 is a functional block diagram illustrating the topology of the water conservation environment 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Water conservation environment 100, in accordance with an embodiment of the present invention (FIG. 1) includes host server 110, faucet 101, sensor 102, drain 104, actuator valve 105, gray drain 106, normal drain 107, all interconnected over network 103. Network 103 can be, for example, a telecommunications network, a local area network (LAN), a wide area network (WAN), such as the Internet, or a combination of the three, and can include wired, wireless, or fiber optic connections. Network 103 can include one or more wired and/or wireless networks that are capable of receiving and transmitting data, voice, and/or video signals, including multimedia signals that include voice, data, and video information. In general, network 103 can be any combination of connections and protocols that can support communications between host server 110, faucet 101, sensor 102, drain 104, actuator valve 105, gray drain 106, normal drain 107, and other computing devices (not shown) within water conservation environment 100.

Faucet 101 in accordance with an embodiment of the present invention is a device capable of distributing/expelling liquids from a pipe system. In one embodiment, faucet 101 is water faucet in a sink. In another embodiment, faucet 101 is shower head in a bathroom.

Sensor 102, in accordance with an embodiment of the present invention is a device of detecting objects within a certain predetermined radius. Sensor 102 may employ any known technique in the art to detect object by various methods (e.g., proximity, motion, fluid level, etc.) such as using IR (infrared) or radio frequency based location (i.e., RADAR). In the depicted environment (FIG. 1), sensor 102 is located adjacent to faucet 101. In other embodiments, sensor 102 can be located or integrated within faucet 101.

Drain 104, in accordance with an embodiment of the present invention is an opening allowing liquids to escape from faucet 101 into another collection pipe.

Actuator valve 105, in accordance with an embodiment of the present invention is a device that directs the flow of liquids into one or more direction. In the depicted environment, actuator valve 105 is a Y-valve that directs incoming liquid to two outlets/output. In other embodiment, actuator valve 105 can direct incoming liquid to three outlets/output. Furthermore, in the current embodiment, actuator valve 105 is located near drain 104. However, in another embodiment, actuator valve 105 can be located or integrated within drain 104.

Gray drain 106, in accordance with an embodiment of the present invention is separate liquid collection system for gray water storage. This system including piping that is separated from the normal waste water (i.e., black water) piping.

Normal drain 107, in accordance with an embodiment of the present invention is the current and existing piping system for directing liquids (typically, black water) back into the sewage collection system.

Host server 110 can be a standalone computing device, a management server, a web server, a mobile computing device, or any other electronic device or computing system capable of receiving, sending, and processing data. In other embodiments, host server 110 can represent a server computing system utilizing multiple computers as a server system, such as in a cloud computing environment. In another embodiment, host server 110 can be a laptop computer, a tablet computer, a netbook computer, a personal computer (PC), a desktop computer, a personal digital assistant (PDA), a smart phone, or any other programmable electronic device capable of communicating with sensor 102, drain 104, actuator valve 105, gray drain 106, normal drain 107, and other computing devices (not shown) within water conservation environment 100 via network 103. In another embodiment, host server 110 represents a computing system utilizing clustered computers and components (e.g., database server computers, application server computers, etc.) that act as a single pool of seamless resources when accessed within water conservation environment 100. In yet another embodiment, host server 110 can be a programmable logic controller (PLC). Host server 110 includes water flow component 111 (refer to FIG. 2).

Water flow component 111 in accordance with an embodiment of the present invention provides the capability of detecting an object blocking the flow of liquid and routing by a diverter valve, the liquid flow to different piping system (e.g., grey water drain system, normal water drain system). Water flow component 111 includes detection component 112 and output component 113.

Figure 2:
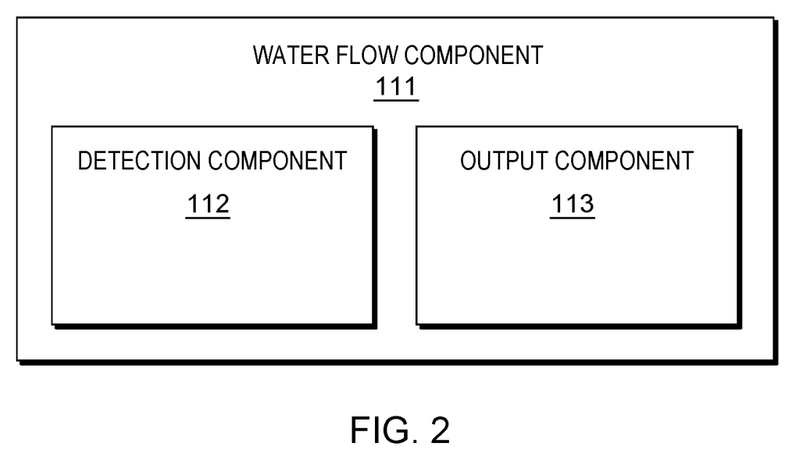
FIG. 2 is a functional block diagram illustrating the components of water flow component 111, in accordance with an embodiment of the present invention.

FIG. 2 is a functional block diagram illustrating the components of water flow component 111, in accordance with an embodiment of the present invention. Water flow component 111 includes detection component 112 and output component 113.

Detection component 112 of the present invention provides the capability of discerning objects detected by sensor 102. In an embodiment, detection component 112 determines the objected detected by sensor 102 meets a threshold requirement. For example, faucet 101 (i.e., located in the bathroom sink) along with sensor 102 is set to operate when detecting the presence of human body parts (i.e., hands). Therefore, a threshold setting is programmed in order to detect the presence or absence of a human hand. Thus, if a toothbrush falls down and is detected by sensor 102, it will not trigger the water conservation system. However, it is noted that detection component 112 can be programmed for other applications such as commercial use where human hands may not be necessary used as a threshold. For example, detection component 112 may be set to be triggered when detecting milling of parts at a machine lathe where the metal bits have not fallen off and contaminated the coolant fluid. The coolant water bath of the lathe may be reused on the subsequent run assuming no metal shaving particles has collected in the same recycled drain for the coolant fluid.

Output component 114 of the present invention provides the capability to send commands to direct the flow of water to gray water collection or normal sewage. In an embodiment, output component 114 can communicate to actuator valve 105 over network 103 to direct the flow of water to either gray drain 106 or normal drain 107. For example, actuator valve 105 is mechanically connected to a PLC output module. In another embodiment, output component 114 can be used to route water or other liquids to two or more pathways.

Figure 3:
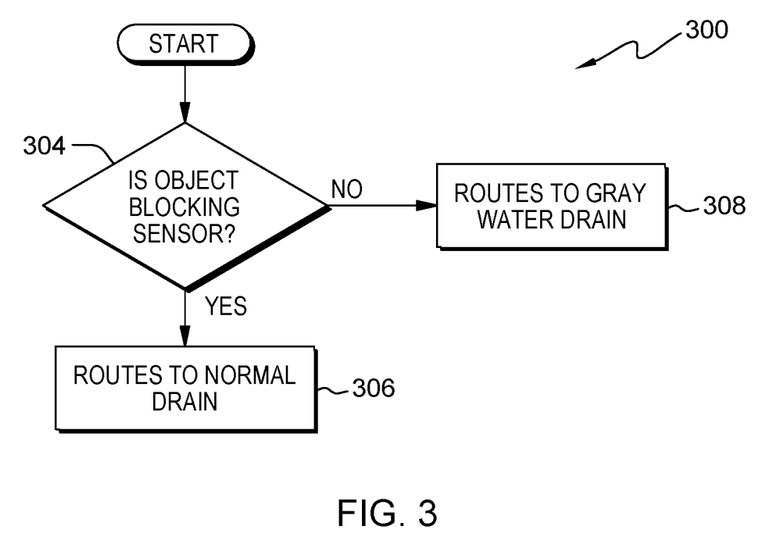
FIG. 3 is a flowchart, designated as 300, depicting operational steps of method for executing the water conservation environment 100, in accordance with an embodiment of the present invention.

FIG. 3 is a flowchart, designated as 300, depicting operational steps of method for executing the water conservation environment 100, in accordance with an embodiment of the present invention.

Water flow component 111 turns on water (step 302). In an embodiment, water flow component 111 is activated when a user turns on water at faucet 101. For example, user turns on water flow at a bathroom sink using faucet 101 to brush his teeth. However, the user lets the water run while brushing his teeth.

Water flow component 111 determines whether there are objects by the sensor (decision block 304). In an embodiment, water flow component 111 through detection component 112 determines whether there are objects (i.e., hand of users) near sensor 102.

If there are no objects detects near faucet 101 ("NO" branch, decision block 304) then water flow component proceeds to route to gray water drain (step 308). However, if there are objects detects near faucet 101 ("YES" branch, decision block 304) then water flow component proceeds to route to normal drain (step 306).

Water flow component 111 routes water to normal water drain (step 306). In an embodiment, water flow component 111 through output component 113 routes water to normal drain 107.

Water flow component 111 routes water to gray water drain (step 308). In an embodiment, water flow component 111 through output component 113 routes water to gray drain 106.

Figure 4:
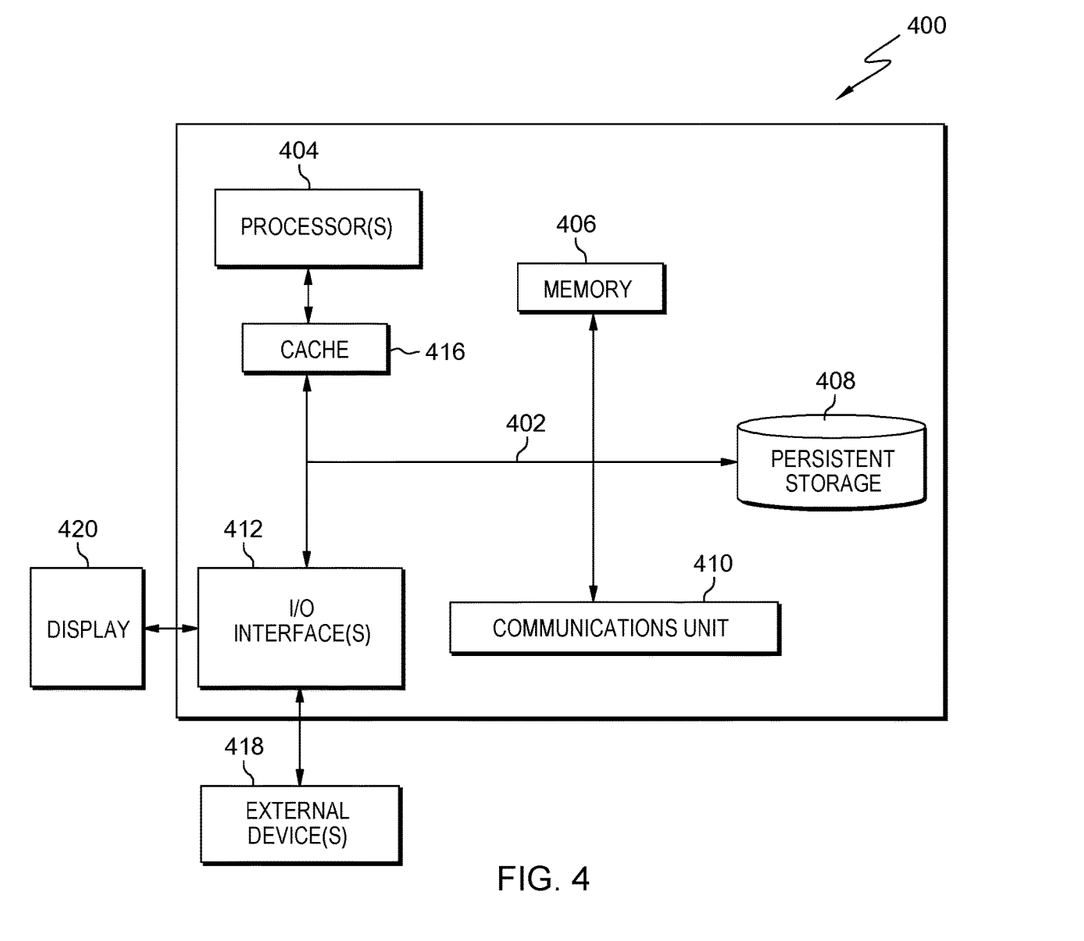
FIG. 4 depicts a block diagram, designated as 400, of components of the server computer executing the program within the host server, in accordance with an embodiment of the present invention.

FIG. 4 depicts a block diagram, designated as 400, of components of the server computer executing the program within the host server accelerator environment of FIG. 1, in accordance with an embodiment of the present invention.

Host server 110 can include processor(s) 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processor(s) 404 by holding recently accessed data, and data near recently accessed data, from memory 406.

Program instructions and data used to practice embodiments of the present invention, e.g., water flow component 111, can be stored in persistent storage 408 for execution and/or access by one or more of the respective processor(s) 404 of host server 110 via memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of machine learning server 130. In these examples, communications unit 410 includes one or more network interface cards. Communications unit 410 may provide communications through the use of either or both physical and wireless communications links. Water flow component 111 may be downloaded to persistent storage 408 of host server 110 through communications unit 410.

I/O interface(s) 412 allows for input and output of data with other devices that may be connected to host server 110. For example, I/O interface(s) 412 may provide a connection to external device(s) 418 such as a keyboard, a keypad, a touch screen, a microphone, a digital camera, and/or some other suitable input device. External device(s) 418 can also include portable computer readable storage media such as, for example, thumb drives, portable optical or magnetic disks, and memory cards. Software and data used to practice embodiments of the present invention, e.g., water flow component 111 on host server 110, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor or the lenses of a head mounted display. Display 420 can also function as a touchscreen, such as a display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for liquid conservation, the method comprising:
    detecting, by one or more processors, if an object is interrupting liquid flowing between a faucet and a drain or if the liquid is accumulated above the bottom of a sink associated with the drain by a predetermined value;
    responsive to detecting an object is interrupting the flowing liquid, routing, by the one or more processors, the flowing liquid to a first destination, based on sending a command to a diverter valve associated with the drain;
    responsive to detecting the accumulated liquid is above the bottom of the sink by the predetermined value, routing, by the one or more processors, the accumulated liquid to the first destination after usage, based on sending a command to the diverter valve associated with the drain; and
    responsive to detecting the flowing liquid is not interrupted by an object and the liquid is not accumulated above the bottom of the sink by the predetermined value, routing, by the one or more processors, the flowing liquid to a second destination, based on sending a command to the diverter valve associated with the drain, wherein the second destination is a grey water recycle system, wherein usage for the grey water recycle system consists of flushing toilets, landscape irrigation and crop irrigation.

2. The computer-implemented method of claim 1, wherein detecting further comprises one or more sensors capable of sensing, at least one of motion, liquid level or proximity.

3. The computer-implemented method of claim 1, wherein the liquid is at least one of a fresh water, a sea water, or a coolant for machinery.

4. The computer-implemented method of claim 1, wherein the first destination further comprises a plumbing system associated with a sewage system.

5. The computer-implemented method of claim 1, wherein the diverter valve is multi-valve.

6. The computer-implemented method of claim 1, wherein sending a command to a diverter valve further comprises:
    sending the command to a programmable logic controller (PLC) output module; and
    energizing a relay output connected to a mechanical linkage to move the diverter valve wherein the relay output is associated with the PLC output module.

7. A computer program product for liquid conservation, the computer program product comprising: one or more computer readable storage medium and program instructions stored on the one or more computer readable storage medium, the stored program instructions comprising:
    program instructions to detect if an object is interrupting liquid flowing between a faucet and a drain or if the liquid is accumulated above the bottom of a sink associated with the drain by a predetermined value;
    responsive to detecting an object is interrupting the flowing liquid, program instructions to route the flowing liquid to a first destination, based on sending a command to a diverter valve associated with the drain;
    responsive to detecting the accumulated liquid is above the bottom of the sink by the predetermined value, routing, by the one or more processors, the accumulated liquid to the first destination after usage, based on sending a command to the diverter valve associated with the drain; and
    responsive to detecting the flowing liquid is not interrupted by an object and the liquid is not accumulated above the bottom of the sink by the predetermined value, routing, by the one or more processors, the flowing liquid to a second destination, based on sending a command to the diverter valve associated with the drain, wherein the second destination is a grey water recycle system, wherein usage for the grey water recycle system consists of flushing toilets, landscape irrigation and crop irrigation.

8. The computer program product of claim 7, wherein detecting further comprises one or more sensors capable of sensing, at least one of motion, liquid level or proximity.

9. The computer program product of claim 7, wherein the liquid is at least one of a fresh water, a sea water, or a coolant for machinery.

10. The computer program product of claim 7, wherein the first destination further comprises a plumbing system associated with a sewage system.

11. The computer program product of claim 7, wherein the second destination further comprises a gray water recycle system.

12. The computer program product of claim 7, wherein the diverter valve is multi-valve.

13. The computer program product of claim 7, sending a command to a diverter valve further comprises:
    program instructions to send the command to a programmable logic controller (PLC) output module; and
    program instructions to energize a relay output connected to a mechanical linkage to move the diverter valve wherein the relay output is associated with the PLC output module.

14. A system for liquid conservation, the system comprising:
    a faucet attached to the top of a liquid containing shell;
    one or more sensors adjacent to the faucet, wherein the sensors can detect if an object is interrupting liquid flowing from the faucet or if the liquid is accumulated above the bottom of the liquid containing shell by a predetermined value;
    a drain connected to the bottom of the liquid containing shell for allowing liquid to exit;
    a diverter valve disposed within a first drain pipe and a second drain pipe and configured to direct the flow of liquids between the first drain pipe and the second drain pipe, wherein the first drain pipe is connected to a sewage system and the second drain pipe is connected to a grey water system and wherein usage for the grey water recycle system consists of flushing toilets, landscape irrigation and crop irrigation;

a control computer communicatively connected to the one or more sensors and a output module wherein the output module is connected to the diverter valve, wherein the control computer routes the liquid to the first drain pipe in response to detecting an object is interrupting liquid flowing from the faucet or if the liquid is accumulated above the bottom of the liquid containing shell by the predetermined value, routes the liquid to the second drain pipe in response to detecting the liquid flowing from the faucet is not interrupted by an object and the liquid is not accumulated above the bottom of the liquid containing shell by the predetermined value.

15. The system of claim 14, wherein the liquid containing shell is at least one of, a kitchen sink, a bath tub or a bathroom sink.

16. The system of claim 14, wherein the one or more sensors is capable of detecting at least of, motion, liquid level, or proximity.

17. The system of claim 14, wherein the controller computer is programmable logic controller (PLC).

18. The system of claim 14, wherein the output module is a PLC analog output module.

19. The system of claim 14, wherein the diverter valve is at least one of a two-way valve or a three-way valve.

* * * * *